Dec. 17, 1968  J. H. ROBERTS  3,417,013
WATER REMOVAL AND DEVICE
Filed Oct. 22, 1965
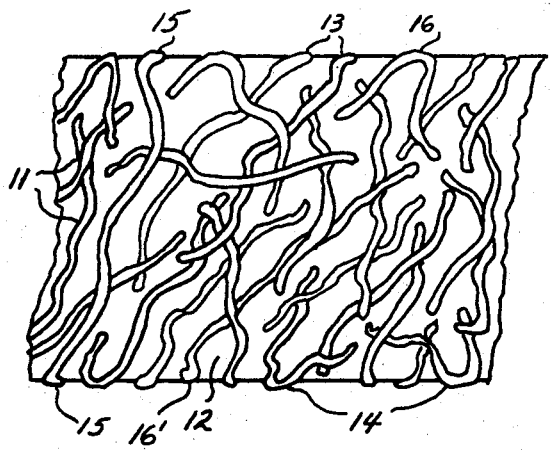
FIG. 1
FIG. 2
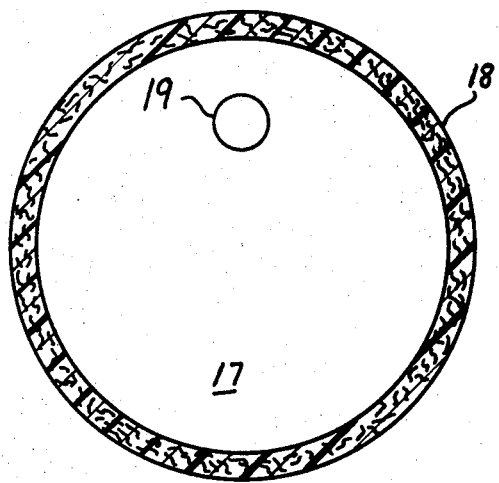
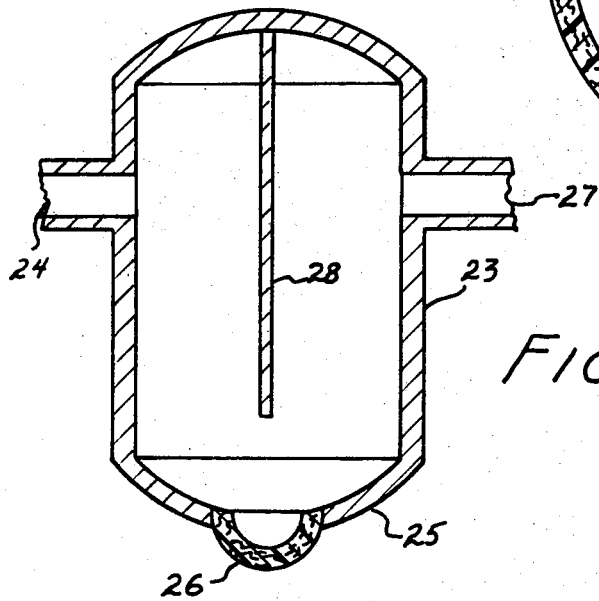
FIG. 3
JOHN H. ROBERTS
INVENTOR.

United States Patent Office 3,417,013
Patented Dec. 17, 1968

3,417,013
WATER REMOVAL AND DEVICE
John H. Roberts, 4833 Holbird Drive Charleston
Heights, S.C. 29405
Filed Oct. 22, 1965, Ser. No. 501,501
15 Claims. (Cl. 208—187)

ABSTRACT OF THE DISCLOSURE

This invention pertains to the separation of water from substances which are insoluble in water. This is accomplished by providing a specially constructed resin sheet which is essentially impermeable to the passage of water insoluble substances, including gases and liquids, but which will permit the passage of water. By contacting one surface of this special sheet with the water contained in a mixture of water and a water insoluble substance the water will be selectively passed through the sheet thereby separating it from the water insoluble substance.

In addition to its impermeability to water insoluble substances the special resin sheet is characterized by having from 25 to 90% of high moisture regain fibers embedded therein with a portion of these fibers being exposed at both surfaces of the sheet and with these exposed fibers on opposite sides of the sheet being connected together by a continuous fiber linkage through the sheet.

---

This invention relates to a device and method for removing water from substances which have limited solubility in liquid water.

It is the principal object of this invention to provide a simple and yet effective device and method for removing water from liquids, gases, and solids which have limited solubility in liquid water. Other objects of this invention will become evident from the following disclosure.

I have discovered that it is possible to selectively remove water, which as employed herein refers to water in either a liquid or gaseous state unless otherwise noted, from any liquids, gases, and solids having limited solubility in liquid water by causing the water present with these substances to contact one surface of certain specially constructed resin impregnated fiber sheets. These special sheets are essentially impervious to most substances having limited water solubility but will pass water through to the opposite surface where it may be withdrawn into an atmosphere of low relative humidity.

Utilizing the principles of this discovery, a device for removing water can be simply and easily made by fabricating a container having at least a portion of one wall constructed from the special sheet material. As the special sheet material is relatively strong and rigid, it is possible to employ it as a structural wall member without any reinforcement. The structural properties of the sheet material are in fact sufficient to enable it to be used in the construction of all walls of the container and the resultant container employed to confine materials under moderate pressures.

This invention may be best understood by referring to the drawings wherein:

FIGURE 1 is a diagrammatic cross sectional view of the special resin impregnated fiber sheet material used in my invention, FIGURE 2 is a cross sectional view of a device for removing water according to my invention, and FIGURE 3 is a cross sectional view of a preferred form of a device for removing water from liquids having a density lower than that of water.

As indicated hereinabove, the critical features of my invention basically reside in the construction of the resin impregnated fiber sheet. As illustrated in FIGURE 1, this sheet is composed of a number of fibers 11 embedded in a resin matrix 12. For use in the present invention it is essential that the sheet meet the following requirements.

The fibers 11 employed in making the sheet must be highly hydroscopic. Suitable fibers have been found to be those which have a moisture regain of at least 6% at 65% relative humidity, i.e., those fibers which after being oven dried will adsorb at least 6% by weight of water based on the oven dry weight of the fibers when they are permitted to reach equilibrium moisture content in an atmosphere having a relative humidity of 65% at ambient temperatures (20–25° C.). For the purposes of this invention the regain at 65% relative humidity appears to present a better indication of the usability of the fiber than does the regain at 100% relative humidity. This is perhaps due to the fact that the regain at 65% relative humidity is approximately equal to the amount of water which will chemically bound to the fiber while the regain at higher relative humidities includes water which is adsorbed on the surface of the fiber in addition to the chemically bound water.

In the preferred practice of this invention fibers having moisture regains of at least 10% at 65% relative humidity should be used in the sheet.

Fibers which have been found to be suitable in this invention are cellulose fibers, protein fibers, and alginate fibers. These fibers may be either natural or synthetic as indicated by the following partial listing of fibers usable in making the resin impregnated fiber sheet.

Cellulose fibers

Natural—cotton, ramie, linen, jute, wood pulp, and hemp.
Synthetic—viscose rayon, cuperammonium rayon, saponified acetate rayon, and cellulose acetate rayon. (Cellulose triacetate and higher esters, e.g., cellulose butyrate, have not been found to be satisfactory.)

Protein fibers

Natural—wool, silk, horny sponge, and various hairs.
Synthetic—casein, Aradil (peanut protein), zein (corn protein), albumenoids and keratins.

Alginate fibers

Synthetic-free alginic acid and heavy metal salts thereof such as, aluminum alginate, calcium alginate, and cadmium alginate.

Of these fibers, the preferred are the cellulose wood pulp fibers which are the least expensive and which, as will be explained hereinafter, can be most easily employed in making suitable resin impregnated fiber sheets.

The term fiber as used herein is not meant to be strictly construed but is intended to include various strips, strands, ribbons, filaments, and like materials which have the general characteristics of fibers. Additionally the term is meant to include the continuous fibrous network of a sponge.

The second requirement of the resin impregnated fiber sheet is that exposed portions of fibers must exist in both surfaces of the sheet. Such exposed portions may be either fiber ends 13 or intermediate portions of the fiber 14. These exposed portions 13 and 14 must be free of any resin coating which would prevent their being contacted with water or low humidity atmosphere passing over the surface of the sheet. If desired, however, these exposed fiber portions may be covered or coated with a suitable hydroscopic substance which will aid in making contact between the water and the exposed portion of the fiber.

A third requirement is that the exposed portions of fibers at either surface of the sheet be connected together by a continuous fiber chain capable of transmitting water through the sheet. This fiber chain may consist of a single fiber 15 having portions exposed at both surfaces of the sheet. Alternatively it may consist of a number of fibers such as from 16 to 16¹ which make sufficient contact with one another to enable the transfer of water from one fiber to another.

It will be obvious that where the chain consists of single fibers such as 15 there will be little problem in meeting this third requirement. However, the manufacture of sheets having such single fiber chains is quite difficult and expensive. It is much easier to make sheets having a number of fibers interconnected together which will provide the required water transfer. This can very simply be accomplished, for example, in a water laid web of wood pulp fibers. The wood pulp fibers, however, differ from many of the other fibers in their physical nature. Due to the treatment involved in pulping and subsequent operations, the wood pulp fiber is fibrilated to a considerable extent resulting in a great increase in the surface area available for contact with other fibers. In addition the wood pulp fibers contain considerable quantities of hemicelluloses, pectins, and other hydroscopic vegetable substances which glue the fibers together at their points of contact and provide a water carrying bridge between the fibers. Most of the other usable fibers and particularly the synthetics do not have these characteristics. Consequently, if they are to be employed in sheets wherein the fiber chain between the surface fibers involves more than one fiber some means must be provided for obtaining the moisture carrying bridge between the fibers. This can most easily be accomplished by coating the fibers with a hydroscopic substance such as the polyhydric alcohols, e.g., glycerol, sorbitol, and the glycols; sugars, e.g., arabinose and galactose; vegetable gums and musilages, e.g., gum acacia and gum tragacanth; pectin; and complex carbohydrates, e.g., pentosans and hemicelluloses. By forming a bridge between the fibers with such substances, water may readily be transferred from one fiber to another through the sheet.

The last requirement is that the resin matrix 12 must form in the general plane of the sheet a continuous, essentially impermeable barrier between the fibers 11 to the passage of fluid through the sheet. It should be noted that the fibers themselves are essentially impermeable to most substances having low solubility in water. As a consequence the finished sheet composed of the two essentially impermeable materials is essentially impermeable. With the exception of these four essential features, the construction of the sheet does not appear to be critical. Thus the thickness of the sheet is relatively unimportant; the primary consideration being the mechanical strength required. As desired, sheets ranging from about 0.01 inch in thickness upwards may be employed.

The resins used to provide the necessary continuous barrier between the fibers may be selected from a wide range of materials. The principal limitations are that they be substantially unaffected by water and by the substances from which the water is to be removed and, of course, that they be capable of providing the required continuous substantially impermeable barrier to the substance from which the water is to be removed.

As regards the permeability of resin impregnated fiber sheets, it is considered that a sheet having a permeability to the substance from which water is to be removed of less than 0.1 fluid ounces per 24 hours per square foot as measured by ASTM 814–55 is considered to be essentially impermeable. (Such tests should be made in the absence of water as even slight solubility of the substance in water will effect the results). In most cases this degree of permeability will be quite satisfactory; however, where highly volatile inflammable materials are involved it is preferred that the permeability be less than 0.001 fluid ounces per 24 hours per square foot.

A brief listing of resins which can be employed includes natural resins, such as, rubber, shellac, and drying oils, e.g., tung and linseed oil; thermoplastic resins such as the acrylics, thermoplastic cellulosics (including gelled cellulose obtained by treatment with materials such as zinc chloride), polyamides, polycarbonates, flurocarbons, styrenes, vinyls, and polyolefins; and thermosetting resins such as amino-aldehydes (except urea aldehydes), phenol-aldehydes, polyesters, silicones, epoxies, and polyiso cyanates. Due to their relatively lost cost, good resistance to most materials, and ease of use in manufacturing the resin impregnated fiber sheets, the preferred resins for general application are the phenol-aldehydes.

The manufacture of the resin impregnated fiber sheets may be accomplished by many well-known expedients of the prior art. The preferred method is to impregnate a single preformed web of fibers with the resin and thereafter to subject the impregnated web to heat, pressure or combinations thereof as necessary to fill the intercies between the fibers with resin and if a thermosetting resin is employed to cure the resin. The fiber webs employed in such a process may be prepared by felting of individual fibers, knitting or weaving of strands or yarns made up of fibers or other means whereby a high degree of fiber to fiber contact is brought about. The resins may be applied in pure form or in solvents as desired with the particular resin used. The sheets thus produced may be flat or in various curved shapes obtainable by the use of appropriate molds. It should be noted that where a hydroscopic coating is to be employed on the fibers, it may be applied anytime prior to impregnation with the resin. Thus the hydroscopic substance may be applied to the individual fibers or, preferably, to the formed web of fibers.

After formation of these sheets, the surfaces are preferably sanded or subjected to some similar treatment to insure the presence of exposed fiber portions on both surfaces of the sheet. Such treatment of the surface will not be needed in all cases, however, particularly where relatively low amounts of resin are employed.

The resin content in the sheets may vary quite widely from a low of about 10% to a high of about 75% by weight (based upon the total resin plus fiber in the sheet). The preferred range is from about 25 to 35% resin. At lower resin contents it often becomes difficult to obtain the necessary impermeable barrier properties while at higher resin contents the costs are raised and the surface fibers tend to be covered by the resin requiring treatment of the surfaces to obtain exposure of fibers.

A satisfactory resin impregnated sheet was prepared by dipping 90#/1,000 square feet kraft liner board into a phenol-formaldeyhyde resin varnish of 50% solids. After removing the liner board from the varnish the surfaces were scraped to remove excess resin solution. The sheet was permitted to air dry and was then pressed at 275° F. for ½-hour at 500 p.s.i. pressure. The finished sheet containing 28.5% phenolic resin was impermeable to gasoline and performed satisfactorily as the bottom wall of a 4½ inch diameter container in removing water from gasoline.

Common industrial laminates have not proved satisfactory in this invention. The apparent cause of this is that these laminates have a relatively high resin content which results in a surface film of resin covering the fibers lying near the surface. Additionally, these laminates are generally prepared from a number of plies and the fibers in each ply are not in contact with fibers in adjacent plies. This does not mean that a plurality of plies or webs cannot be employed in making my sheet. They can if care is taken to insure fiber to fiber contact between the plies. Such contact is greatly facilitated by using lower quantities of resin on the order of 20 to 30% or by coating the surface of the plies with a suitable hydroscopic substance prior to assembly. Many methods for preparing resin impregnated sheets for use in this invention other than those described may obviously be employed. Any of these methods will be satisfactory so long as the sheets produced meet the critical requirements specified hereinabove.

As illustrated in FIGURE 2, the simplest device of this invention is a cylindrical container 17 having walls 18 composed of the resin impregnated fiber sheet described above. The container should, of course, be equipped with suitable inlets or outlets 19 to permit the passage of the water bearing substances through the device.

Preferably the device is also equipped with means for passing low humidity atmosphere over the exterior surface of the resin impregnated fiber sheets. This can be easily provided by a fan blowing air across a heater and then over the surface of the container or by many other well-known means.

Many obvious variations can be made in both the shapes and form of this simple device. The entire wall does not have to be made of resin impregnated fiber sheets but only a portion thereof. If only a portion of the wall is made of the resin impregnated fiber sheet, this portion should be that which will be contacted with the water contained in the substance from which it is to be removed. Thus if water is being removed from a lighter than water liquid where the water will settle, the resin impregnated fiber sheet should constitute a portion of the bottom wall. With a substance heavier than water the reverse would be the case and the resin impregnated fiber sheet should constitute a portion of the top wall.

Based upon this principle, FIGURE 3 illustrates a preferred form of my device for removing water from a lighter than water liquid such as petroleum hydrocarbon. This device comprises a container 23 having an inlet 24 through which the water contaminated hydrocarbon is fed to the container. The bottom walls 25 of the container 23 are sloped downwardly to a sump 26 which is composed of resin impregnated fiber sheet. The container is of sufficient size to permit settling out of the water which will eventually collect in the sump where it will be removed from the system. Clean water free hydrocarbon can then be withdrawn through outlet 27.

Such a device may if desired be equipped with a baffle 28 or other similar device to aid settling of the water in the container.

This invention may be employed to remove water from a wide variety of solid, liquid or gaseous products. It is, however, best adapted to removing water from liquids having a solubility of less than 1 part by weight per 100 parts by weight of liquid water. Among the many compounds in this category are the saturated and unsaturated hydrocarbons having 5 or more carbons and most derivatives thereof including common mixtures thereof such as gasoline, kerosene, petroleum ether, varsol and mineral oils; saturated and unsaturated cyclic hydrocarbons and derivatives thereof of having 5 or more carbon atoms such as cyclohexadiene, cyclopentane, and cyclohexane; aromatic hydrocarbons and derivatives thereof such as benzene, toluene, and styrene; monocarboxylic aliphatic acids having 6 or more carbon atoms; aliphatic monoalcohols of 6 or more carbon atoms; organic ethers containing 5 or more carbon atoms; organic esters containing 5 or more carbon atoms; organic sulphides such as dimethyl sulfide, divinyl sulfide and carbon disulfide; thiols having 3 or more carbon atoms; halogenated organic compounds such as phenyl fluoride, chloropicrin, chloroprene, epichlorohydrin, ethylene chloride, butyl bromide, 3-iodo propane, and the flurochlorohydrocarbons, e.g., 1,1,2,2-tetrachloro 1.2-difluoro ethane and the Freons; heterocyclic compounds such as furan and thiophene; many aldehydes such as benzaldehyde and caproaldehyde; ketones having 6 or more carbon atoms; organo metal compounds such as tetramethyl lead, triethylsilicone, ethyl selenide, dimethyl telluride, dimethyl mercury, tetramethyl tin, and boron triethyl; certain amines such as difurylamine and triethylamine; and such various miscellaneous organic liquids such as allyl cyanide, allyl isocyanide, benzanilide, ethylene nitrate, nitroglycerin, diethyl phosphine, methyl carbonate, and vitamin K.

While this invention is best adapted to removing water from the liquids above which are essentially inert and insoluble in water, it may be employed with other liquids which have somewhat greater solubility in water, i.e., up to about 10 parts by weight per 100 parts by weight of water. When employed with such more soluble liquids there will generally be some loss of the liquid with the water being removed. Additional problems may also be encountered if the dissolved liquid greatly alters the adsorption and desorption characteristics of the water. In spite of these problems, however, water can be removed from such liquids of limited solubility where the amount of contaminating water is relatively small and in many cases the present invention is much more satisfactory, particularly with volatile liquids, than processes hereto available.

This invention can also be advantageously employed in reducing the water vapor composition of gases which have limited solubility in liquid water, i.e., less than 2% by weight. Examples of such gases are nitrogen; oxygen; helium; argon; neon; the hydrocarbon gases, such as methane, ethane, ethylene, acetylene, butane, and butadiene; nitrogen halides; hydrogen; and carbon monoxide. Because of the limitations of this invention it is not feasible to completely dry gases. It is possible to reduce the relative humidity of the gases, however, to about 10 to 15% after which conventional adsorbents can be employed to pick up the remaining water vapor.

The invention may additionally be employed to remove water from solids having limited solubility in liquid water, i.e., less than 2 parts by weight per 100 parts by weight of water. However, due to the ease of current methods of drying and the difficulties involved in this invention of causing the flow of wet solids over the resin impregnated fiber sheet, the present invention should have little utility in this field except in the case of extremely heat sensitive materials.

For operation of this invention it is essential that the relative humidity of the atmosphere in contact with the exterior surface of the resin impregnated fiber sheet be at least 10% less than that existing at the interior surface of the sheet. Preferably this relative humidity should be at least 50% lower. In the case where the water being removed is liquid the interior relative humidity will be 100% and the atmosphere on the exterior surface need be maintained at 90% relative humidity or below. As long as liquid water exists at the interior surface of the resin impregnated fiber sheet water will continue to be removed. Consequently all liquid water can be removed although the external atmosphere is as high as 90%.

In the case of the water being in a gaseous state the situation is somewhat different. As water is removed the relative humidity will decrease until an equilibrium is reached at which the relative humidity of the gases in the container is approximately 10% higher than that of the atmosphere at the outside of the container. For this reason in order to obtain optimum water removal it is essential that the relative humidity of the surrounding atmosphere be essentially zero.

It is not necessary to maintain the relative humidity differential at all times as the water removing function of my invention will operate automatically whenever the required differential in relative humidity occurs. This ability for intermittent operation permits the use in this invention of ambient atmosphere to obtain the humidity conditions for removing water which is in a liquid state. Thus where the ambient atmosphere has a relative humidity of less than 90% water will be withdrawn while on rainy days when the relative humidity is above 90% no water will be removed. In most climates such operation will be quite satisfactory for removing water from storage tanks and the like.

While the present invention is primarily directed to removing water from other substances it may in addition be employed in a similar manner to remove such substances as formic and acetic acids and methyl and ethyl alcohols from materials having low solubility therein. The resin impregnated fiber sheets made using cellulose fibers will selectively separate these relative volatile organic substances from other materials about as well as they will separate water.

While this invention has been described herein in connection with certain embodiments, many changes may be made without departing from the spirit of the present invention which is the use of special resin impregnated fiber sheets in conjunction with a differential in relative humidity to remove water from liquid, solid or gaseous materials having limited solubility in liquid water.

I claim:

1. A container capable of removing water from substances having limited solubility in liquid water which comprises a set of enclosing walls having an inlet and outlet to permit the passage of said substances through said container, at least a portion of said walls being composed of a resin sheet having fibers embedded therein, said sheet containing from 10 to 75% by weight of resin and from 90 to 25% by weight of fibers having a moisture regain at 65% relative humidity of at least 6% and said sheet forming an essentially impermeable barrier to the passage therethrough of said substances having limited water solubility; said sheet further having portions of a plurality of said fibers exposed at both surfaces, said exposed portions on either surface being connected by a continuous fiber linkage capable of transporting water through said sheet.

2. The container of claim 1 for removing water from a water insoluble liquid having a density less than that of water wherein said sheet comprises a bottom wall of the container.

3. The container of claim 1 for removing water from a water-insoluble, lighter-than-water liquid wherein said container has a bottom wall which slopes downwardly in at least one direction, said sloped bottom terminating at a sump which is composed of said resin sheet.

4. The container of claim 1 wherein the fibers in said sheet are selected from the group consisting of a cellulosic, proteinaceous and alginate fibers.

5. The container of claim 4 wherein the fibers forming said fiber linkage are connected together with a hydroscopic substance.

6. The container of claim 5 wherein the fibers are cellulose wood pulp.

7. The container of claim 1 wherein the resin in said resin impregnated fiber is a thermosetting phenolic resin.

8. The container of claim 1 wherein the fibers have a moisture regain at 65% relative humidity of at least 10%.

9. The method of removing water from substances having limited solubility in liquid water which comprises contacting said water with one surface of a resin impregnated fiber sheet while an atmosphere having a relative humidity of less than 90% is in contact with the opposite surface of said sheet, said resin sheet being composed of from 25 to 90% by weight of fibers having a moisture regain of at least 6% at 65% relative humidity embedded in a matrix of from 10 to 74% by weight of resin which forms an essentially impermeable barrier to the passage of said substances through the sheet and having portions of fibers exposed at both surfaces of said sheet, said exposed portions on either surface being connected by a continuous fiber linkage capable of transporting water through the sheet.

10. The method of claim 9 wherein the substance from which the water is being removed is a gas having a solubility of less than 2% by weight in liquid water.

11. The method of claim 9 wherein the substance from which the water is being removed is a liquid having a solubility in liquid water of not more than 10% by weight.

12. The method of claim 11 wherein the liquid from which the water is being removed is a liquid having a solubility in liquid water of less than 1% by weight.

13. The method of claim 12 wherein the liquid is a petroleum hydrocarbon.

14. The method of claim 9 wherein the relative humidity of the atmosphere in contact with the opposite surface of the sheet is less than 50%.

15. The method of claim 9 wherein the relative humidity of the atmosphere in contact with said opposite surface of the sheet is essentially 0.

References Cited

UNITED STATES PATENTS

| 2,539,768 | 1/1951 | Anderson. | |
| 3,219,194 | 11/1965 | Schwartzwalder et al. | 210—508 |
| 2,357,767 | 9/1944 | Robbins | 208—188 |

FOREIGN PATENTS 682,400  9/1952  England.

DELBERT E. GANTZ, *Primary Examiner.*

G. J. CRASANAKIS, *Assistant Examiner.*

U.S. Cl. X.R.

210—508; 208—188